United States Patent
Maharaja

(10) Patent No.: US 12,020,387 B2
(45) Date of Patent: Jun. 25, 2024

(54) INTELLIGENT DATA MIGRATION VIA MIXED REALITY

(71) Applicant: Bank of America Corporation, Charlotte, NC (US)

(72) Inventor: Raja Arumugam Maharaja, Chennai Tamil Nadu (IN)

(73) Assignee: Bank of America Corporation, Charlotte, NC (US)

( * ) Notice: Subject to any disclaimer, the term of this patent is extended or adjusted under 35 U.S.C. 154(b) by 114 days.

(21) Appl. No.: 17/872,119

(22) Filed: Jul. 25, 2022

(65) Prior Publication Data

US 2024/0029364 A1 Jan. 25, 2024

(51) Int. Cl.
*G06T 19/00* (2011.01)
*G02B 27/00* (2006.01)
*G02B 27/01* (2006.01)
*G06F 16/21* (2019.01)

(52) U.S. Cl.
CPC ........ *G06T 19/006* (2013.01); *G02B 27/0012* (2013.01); *G06F 16/214* (2019.01); *G02B 2027/0178* (2013.01)

(58) Field of Classification Search
CPC .............. G06T 19/006; G02B 27/0012; G02B 2027/0178; G06F 16/214
See application file for complete search history.

(56) References Cited

U.S. PATENT DOCUMENTS

| | | | | |
|---|---|---|---|---|
| 10,354,419 B2* | 7/2019 | Ritchie | ................... | G06F 40/18 |
| 10,917,587 B2* | 2/2021 | Hansbrough | ......... | G06T 11/206 |
| 11,480,791 B2* | 10/2022 | Berliner | ................ | H04L 67/131 |
| 11,526,475 B2* | 12/2022 | Eswaran | ................ | G06F 16/252 |
| 11,748,634 B1* | 9/2023 | Kulkarni | .................. | G06F 18/21 |
| | | | | 707/722 |
| 2015/0356068 A1* | 12/2015 | Hill | ...................... | G06F 3/04842 |
| | | | | 715/227 |
| 2016/0239751 A1* | 8/2016 | Mosterman | .............. | G06N 7/01 |
| 2019/0139280 A1* | 5/2019 | Hubel | .................... | G06T 19/006 |
| 2019/0179937 A1* | 6/2019 | Banerjee | ................. | G06F 16/24 |
| 2022/0382722 A1* | 12/2022 | Mahna | ..................... | G06F 40/30 |
| 2023/0023645 A1* | 1/2023 | Retinraj | ................. | G06N 3/042 |

OTHER PUBLICATIONS

Doan, AnHai, Pedro Domingos, and Alon Halevy. "Learning to match the schemas of data sources: A multistrategy approach." Machine Learning 50 (2003): 279-301. (Year: 2003).*

* cited by examiner

*Primary Examiner* — Motilewa Good-Johnson
(74) *Attorney, Agent, or Firm* — Weiss & Arons LLP

(57) ABSTRACT

Systems, methods, and apparatus are provided for migrating data using an MR application. A smart glasses device may interface with a source database having a first schema. The smart glasses device may include an MR application. Using machine learning, the MR application may identify transfer data in a source database display for migration and convert a captured image of the transfer data to machine-encoded text. The smart glasses device may render the transfer data in the MR environment. The smart glasses device may connect to a target database having a second schema. Using machine learning, the MR application may derive the second schema and apply it to the transfer data. The MR environment may enable the user to modify the transfer data and replicate the modified data to generate a new sample set. The MR application may populate the target database with values from the new sample set.

21 Claims, 6 Drawing Sheets

INTELLIGENT DATA MIGRATION VIA MIXED REALITY

FIELD OF TECHNOLOGY

Aspects of the disclosure relate to migration and replication of database values.

BACKGROUND OF THE DISCLOSURE

Performance testing protocols may require shifting large amounts data between environments. Conventionally, third party tools or built-in database functionalities are used to transfer the data. These transfers are typically slow and consume significant system resources. The transfer protocols are cumbersome, requiring many input parameters, and are not easily customized if only portions of the data are needed for testing. In some cases, specific logic needs to be written in order to replicate the data in the target region or to generate a sample set from the data.

Mixed reality (MR) technology blends physical and digital worlds. In an MR environment, physical and virtual objects may exist and interact with each other in real time. A user may manipulate both physical and virtual items.

It would be desirable to use an MR application for migrating values from a source region to a target region. An intermediary MR environment combined with machine learning would improve transfer efficiency and conserve resources, while also enabling customization of sample sets for testing.

SUMMARY OF THE DISCLOSURE

Systems, methods, and apparatus for intelligent migration of database values via mixed reality are provided.

A smart glasses device may include an MR application. The smart glasses device may connect to a source database having a first database schema. Using one or more machine learning algorithms, the MR application may identify transfer data on a source database display. The smart glasses may capture and store an image of the transfer data. The machine learning algorithms may convert the image to machine-encoded text.

The smart glasses device may generate an MR environment and render the transfer data in the MR environment. In some embodiments, the smart glasses device may interface with an external MR device having a greater storage capacity. The external MR device may maintain the MR environment.

The smart glasses may disconnect from the source database and connect to a target database having a second schema. Using the machine learning algorithms, the MR application may derive the second schema and apply it to the transfer data.

The MR application may offer selectable options for modifying or replicating the transfer data. Based on the selections, the MR application may generate logic for creating a new sample set. The MR application may populate the target database with values form the new sample set.

These protocols for migrating data are a practical application of mixed reality technology that improves the speed and efficiency of database transfers. Protocols include intelligent smart glasses capture at a first database, modification and replication in a mixed reality environment, and intelligent insertion at a second database. These features reduce the processing burden on the system and free up resources that would be expended in a conventional transfer.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
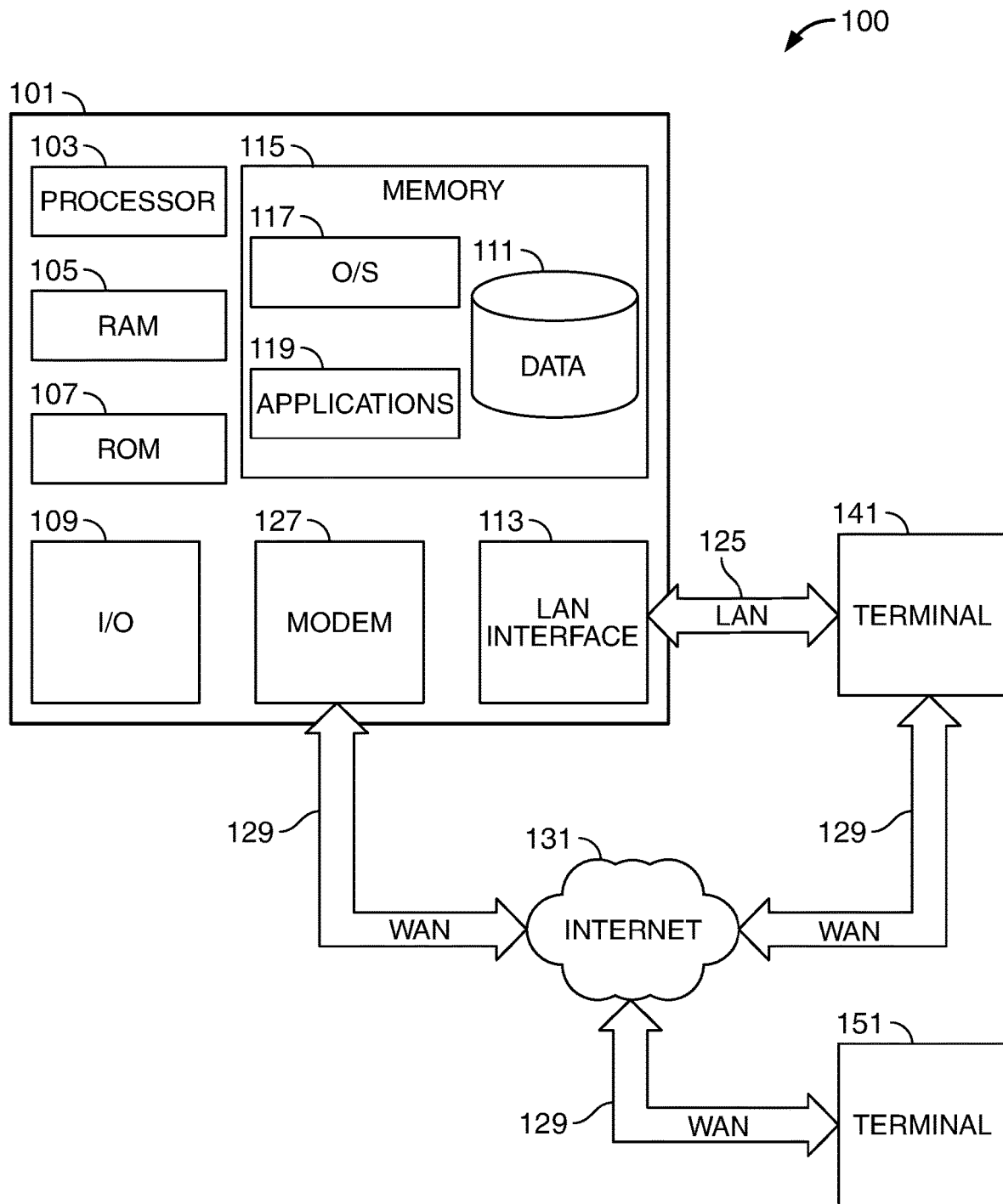
FIG. 1 shows illustrative apparatus in accordance with principles of the disclosure.

Systems, methods, and apparatus are provided for intelligent migration of database values via mixed reality.

For the sake of illustration, the invention will be described as being performed by a "system." The system may include one or more features of apparatus and methods that are described herein and/or any other suitable device or approach.

The system may include a smart glasses device or a mixed reality headset. The smart glasses may be structured with a frame and lenses. The frame and/or lenses may include embedded or partially embedded hardware and software components.

The smart glasses may include one or more microprocessors. The smart glasses may include one or more software applications. The applications may enable the smart glasses to execute various tasks. One or more of the software applications may be executed on the processors. Software applications may be stored in a memory embedded in the smart glasses.

The smart glasses may include one or more communication transceivers. The communication transceivers may be operable to communicate with an external processor. The external processor may be located within a mobile device or any other suitable computing device.

The smart glasses may include a nano wireless network interface card ("NIC"). The nano wireless NIC may provide the smart glasses with a dedicated, full-time connection to a wireless network. The nano wireless NIC may implement the physical layer circuitry necessary for communicating with a data link layer standard, such as Wi-Fi. The nano wireless NIC may support input/output ('I/O"), interrupt, direct memory access, interfaces, data transmission, network traffic engineering and/or partitioning.

The smart glasses may include a wireless controller application. The wireless controller application may be configured to interface between the NIC and an external Wi-Fi device. The wireless controller application may be configured to transmit data collected by the smart glasses over the wireless network.

The smart glasses may include an active near field communication ("NFC") reader configured to establish contactless communication with another device located within a predetermined proximity to the smart glasses device.

The smart glasses may include an embedded subscriber identification module ("E-SIM") card. The E-SIM may enable the smart glasses to communicate and share data with another pair of smart glasses. The smart glasses may include one or more wired and/or wireless communication applications such as Bluetooth™. Smart glasses may utilize cellular technology or Wi-Fi to be operable as wearable computers running self-contained mobile applications.

The smart glasses may include a battery. The battery may be configured to power hardware components such as the microprocessor and the display. The battery may be rechargeable. The battery may be recharged via any suitable method. Illustrative charging methods include solar charging, wireless inductive charging, and connection via a charging port.

The smart glasses may include one or more cameras for capturing images and/or videos, one or more audio input devices, and one or more audio output devices.

Smart glasses inputs from a user may be hands-on. Smart glasses inputs from a user may be hands-free. In some embodiments, smart glasses inputs may involve a combination of hands-on and hands-free protocols.

In some embodiments, the smart glasses inputs may be hands-on. The smart glasses may require the use of touch buttons on the frame. In some embodiments, the user input may also be entered via a nano touch screen incorporated into the frame or lenses of the smart glasses. The nano touch screen may be a nano light emitting diode ("LED") touch screen. The nano touch screen may be a nano organic light emitting diode ("OLED") touch screen.

The touch screen may receive touch-based user input. As such, the nano LED touch screen may cover a portion of the frames and/or lenses of the smart glasses. Touch-based gestures may include swiping, tapping, squeezing and any other suitable touch-based gestures or combination of touch-based gestures.

In some embodiments, the smart glasses inputs may be hands-free. The smart glasses may receive hands-free input through voice commands, gesture recognition, eye tracking or any other suitable method. Gesture recognition may include air-based hand and/or body gestures. Air-based gestures may be performed without touching the smart glasses.

The smart glasses may include one or more sensors. Illustrative sensors may include a touch screen, camera, accelerometer, gyroscope, and any other suitable sensors. The smart glasses sensors may detect hands-free input such as air gestures or eye movement.

Smart glasses applications may be used to copy data more efficiently from a source database to a target database. The smart glasses may directly interface with the source region and the target region.

The smart glasses may be powered by an MR application that includes one or more machine learning modules. Smart glasses capture in combination with machine learning algorithms may enable the user to navigate the source region to select data for transfer.

The system may include an intermediary MR device configured to interface with the source region and the target region. The use of MR in combination with machine learning algorithms may enable a user to customize the data precisely and efficiently and to generate new data sets for insertion into the target region.

In some embodiments, the smart glasses may function as the intermediary MR device. In some embodiments, the intermediary MR device may be an external device. The external MR device may work together with the MR application on the smart glasses device. The choice of intermediary device may be based on the size of a required data set. The choice of intermediary device may be based on the storage capacity of the device.

The smart glasses may connect to the source region. A user may view a source region display through the smart glasses. Machine learning algorithms within the MR application may identify the data that needs to be moved. The smart glasses may prompt the user to scroll or move to a different portion of the display in order to capture all of the necessary data. The system may capture an image of the data. The system may copy the data to a storage region on the smart glasses.

The MR application on an intermediary MR device may generate and maintain an MR environment. The MR application may render the captured data in the MR environment. The intermediary MR device may be the smart glasses. The intermediary MR device may be an external MR device.

The intermediary MR device may connect to either the source environment or the target environment. The MR device may connect to only one environment at a time to prevent data breaches. Following capture of the data from the source environment, the MR device may disconnect from the source environment.

The MR device may connect to the target environment. Machine learning modules in the MR application may convert unrecognized data that has been rendered into the mixed reality environment into a readable format. The image stored by the smart glasses may be converted into machine-encoded text.

The machine learning algorithms may use existing data in the target region to determine schema in use in the target region. The data may be reconfigured into the layout of the target region.

The user may engage with the MR environment via smart glasses input. Within the MR environment, the user may be offered options to move or edit the data. For example, the user may insert a value, create a new column, move a column, or select a subset of the data.

Within the MR environment, the user may be offered an option to replicate the data in order to generate sample sets of a specific size. For example, the testing performance protocols may require a data set of one million records. The system may replicate the values captured from the source region to generate the sample set. Logic for data replication may be generated by machine learning algorithms within the MR application.

The machine learning algorithms may create the replicated or edited tables in either temporary or permanent space within the target region. In some embodiments, the choice of storage medium may depend on the access properties for the user in the target region.

A database trigger within the application may populate the target region database with the stored values. In some embodiments, values may be transferred from the MR application to a temporary application within the target region. In some embodiments, the temporary application may be running within the target region. In some embodiments, the temporary application may be running on an intermediary MR device.

One or more non-transitory computer-readable media storing computer-executable instructions are provided. When executed by a processor on a computer system, the instructions perform a method for migrating data between databases using a mixed reality application on a smart glasses device.

The method may include, at a smart glasses device running a mixed reality application, connecting to a source database having a first database schema. The method may include, using one or more machine learning algorithms, identifying transfer values based at least in part on a view of a source database display. The method may include capturing an image of the transfer values and storing the image on the smart glasses device.

The method may include, at an intermediary MR device, generating a mixed reality environment and rendering the stored transfer values in the mixed reality environment. The method may include connecting to a target database having a second schema.

The method may include, using the machine learning algorithms, deriving the second schema from values in the target database and applying the second schema to the rendered transfer values. The method may include displaying selectable options for replicating the transfer values in the mixed reality environment.

The method may include generating logic for creating a new sample set based on the replicated transfer values and populating the target database with values from the new sample set.

Systems, methods, and apparatus in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative apparatus 100 that may be configured in accordance with the principles of the invention. FIG. 1 is a block diagram that illustrates a computing device 101 (alternatively referred to herein as a "server or computer") that may be used in accordance with the principles of the invention. The computer server 101 may have a processor 103 for controlling overall operation of the server and its associated components, including RAM 105, ROM 107, input/output ("I/O") module 109, and memory 115.

I/O module 109 may include a microphone, keypad, touch-sensitive screen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database.

Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks.

When used in a LAN networking environment, computer 101 is connected to LAN 125 through a network interface or adapter 113.

When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 119, which may be used by server 101, may include computer executable instructions for invoking user functionality related to communication, such as email, short message service (SMS), authentication services and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that encrypt information, process received executable instructions, interact with enterprise systems, perform power management routines or other suitable tasks. Algorithms may be used to perform the functions of one or more of capturing source domain data, maintaining a mixed reality environment, capturing target domain schema, modifying transfer data, replicating values, and/or perform any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
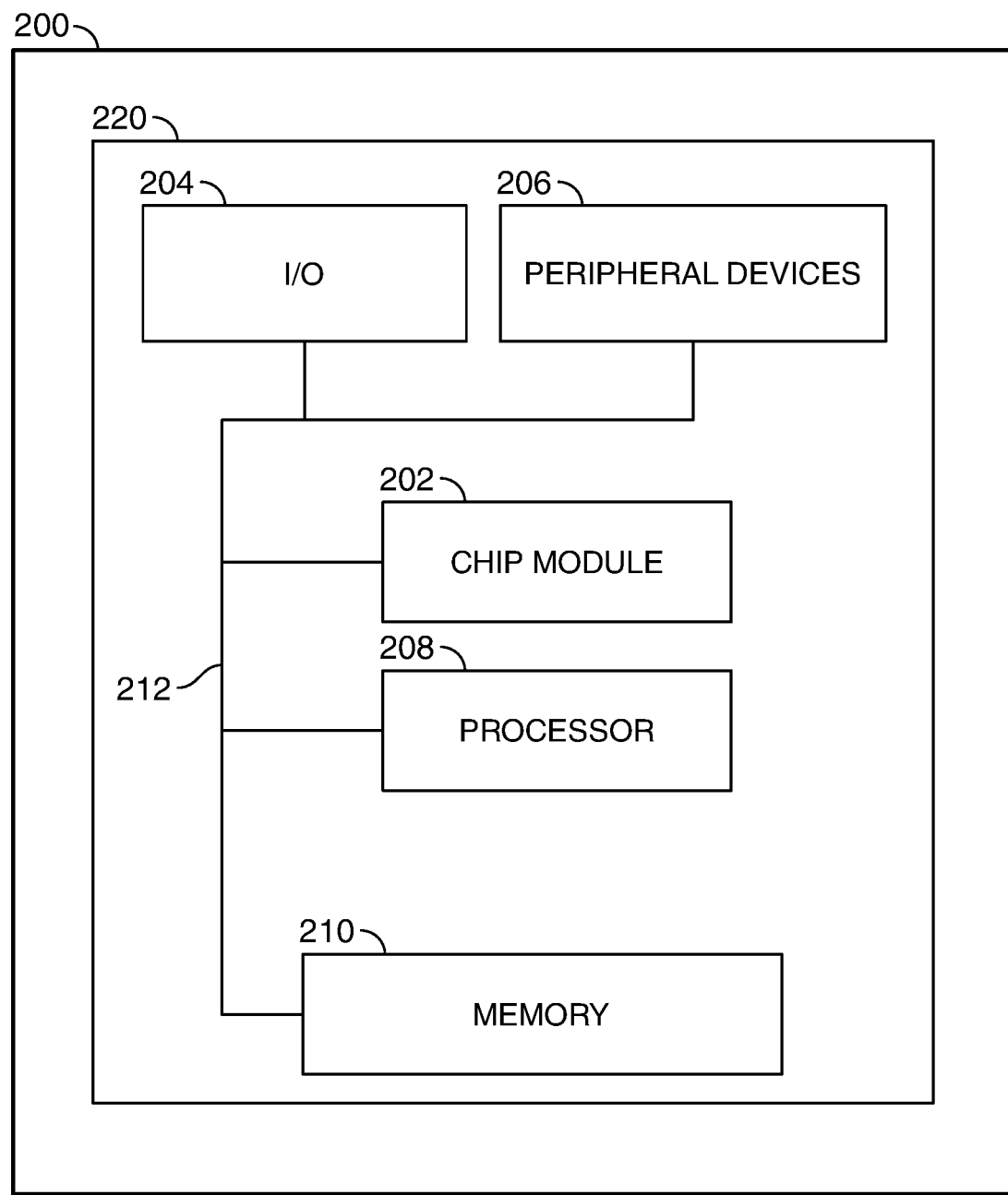
FIG. 2 shows illustrative apparatus in accordance with principles of the disclosure.

FIG. 2 shows an illustrative apparatus 200 that may be configured in accordance with the principles of the invention.

Apparatus 200 may be a computing machine. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may identify and capture source domain data, maintain a mixed reality environment, capture target domain schema, modify transfer data, generate replication logic, generate a sample set and perform other methods described herein; and machine-readable memory 210.

Machine-readable memory 210 may be configured to store in machine-readable data structures: source domain data, target domain schema, modified transfer values, sample sets, and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
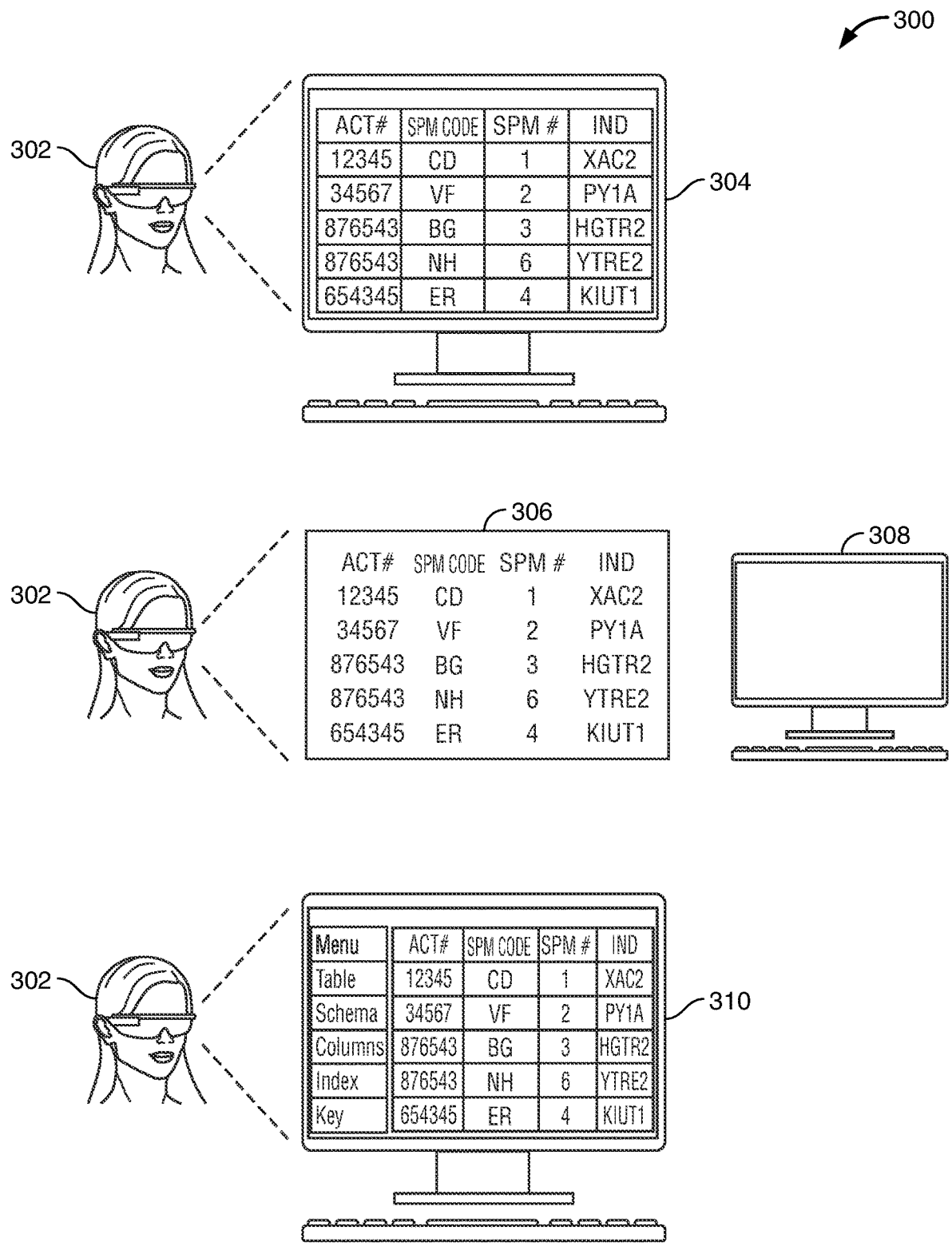
FIG. 3 shows an illustrative process flow in accordance with principles of the disclosure.

FIG. 3 shows scenarios 300 for migrating data from a source domain to a target domain. Smart glasses user 302 may connect to a source domain. Smart glasses user 302 may view source domain display 304. The smart glasses may include a mixed reality application. The smart glasses may include one or more machine learning algorithms. The machine learning algorithms may identify data from display 304 for transfer. The smart glasses may capture the data for transfer.

The captured data may be displayed in a mixed reality environment. Smart glasses user 302 may view mixed reality display 306. The display may be projected from the smart glasses onto a physical or virtual screen in the mixed reality environment. Smart glasses user 302 may connect to a target domain. Smart glasses user 302 may view target domain display 308. Machine learning algorithms may derive target domain schema from existing data in display 308.

Smart glasses user 302 may transfer the modified data to populate the target domain. The data may be displayed at target domain display 310.

Figure 4:
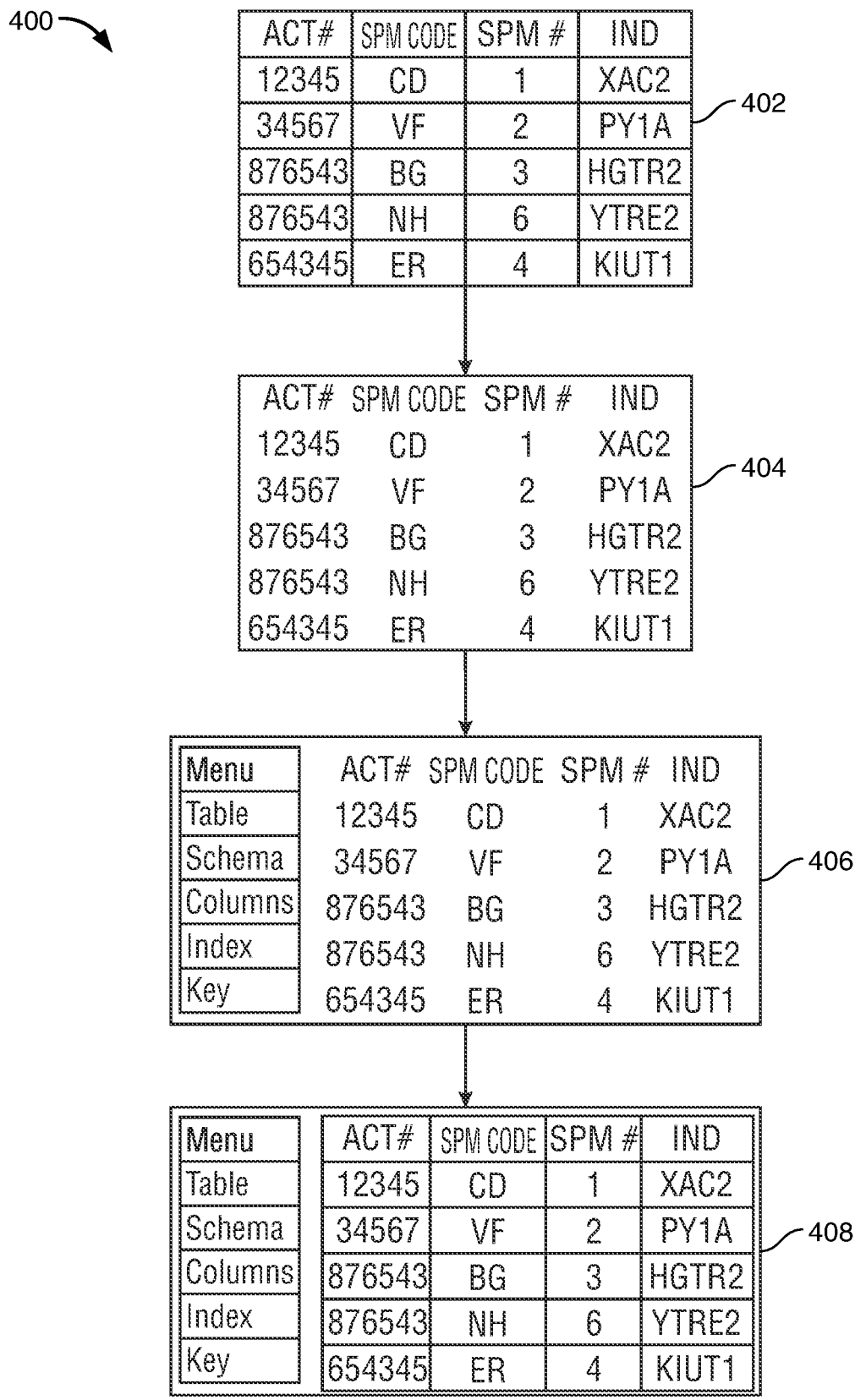
FIG. 4 shows an illustrative process flow in accordance with principles of the disclosure.

FIG. 4 shows illustrative process flow 400 for mixed reality database migration. Process flow 400 illustrates the transfer from the source domain to an intermediary MR device.

Source domain display 402 includes tables of data. A smart glasses device may capture the data from source domain display 402. Machine learning algorithms may identify data for transfer and convert a captured image of the screen into machine-encoded text.

The smart glasses device may display the captured data in an MR environment. A user may interact with MR display 404 through the smart glasses. MR display 404 may include raw, unformatted data.

The smart glasses device may connect to the target domain and derive the database schema associated with the target domain. MR display 406 may include the derived target domain features.

The smart glasses may apply the database schema to the data. MR display 408 may show the data as configured for the target domain. The smart glasses may store the reconfigured data for insertion into the target domain.

In some embodiments, displays 404, 406, and 408 may be maintained by an external MR device interfacing with the smart glasses application.

Figure 5:
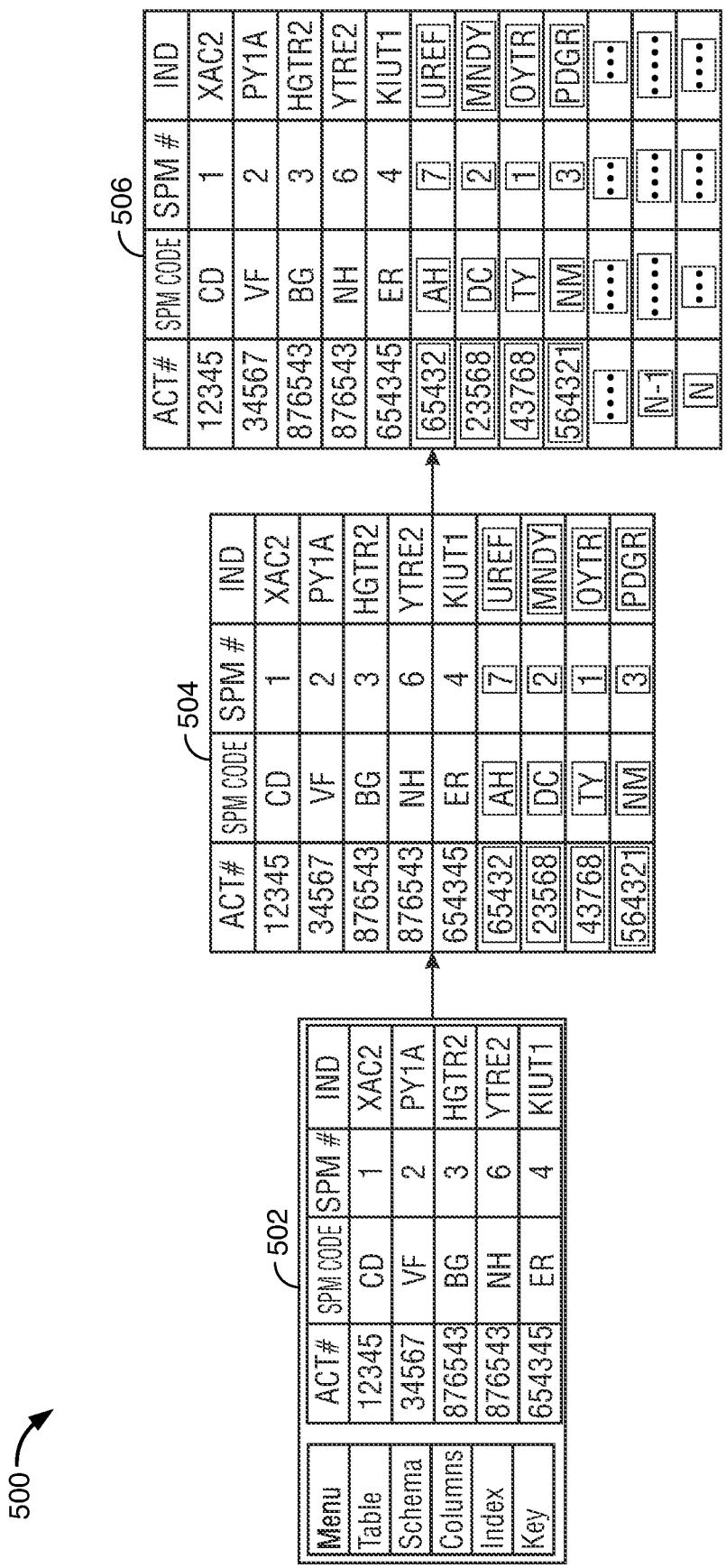
FIG. 5 shows an illustrative process flow in accordance with principles of the disclosure.

FIG. 5 shows illustrative process flow 500 for mixed reality database migration. Process flow 500 illustrates the transfer from the intermediary MR device to the target domain.

MR display 502 may correspond to display 408, shown in FIG. 4. MR display 502 may include data as modified for the target domain. A user may view and interact with MR display 502 in an MR environment generated by user smart glasses or by an external MR device.

The MR environment may include a selectable option for replicating the data to generate a new set of values for testing. Machine learning algorithms may generate the logic for replication. MR display 504 shows a first set of replicated values. Display 506 shows a full set of replicated values. A database trigger may populate the target domain with the new sample set.

Figure 6:
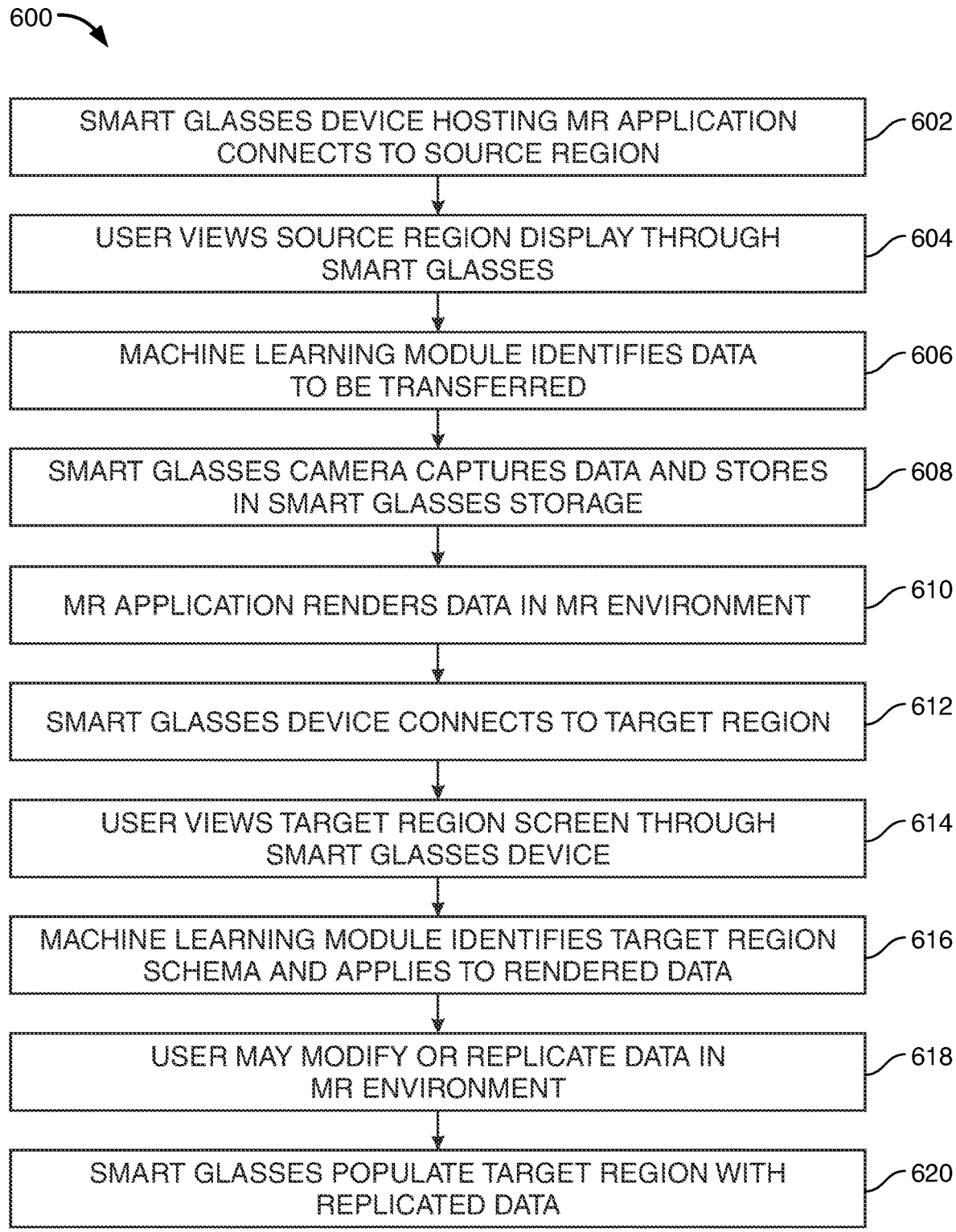
FIG. 6 shows an illustrative process flow in accordance with principles of the disclosure.

FIG. 6 shows process flow 600 for database migration using mixed reality protocols. At step 602, a smart glasses device hosting an MR application connects to the source region. At step 604, the user views a source region display through the smart glasses device. At step 606, a machine learning module within the smart glasses MR application identifies data to be transferred. At step 608, a smart glasses camera captures and stores an image of the data. The machine learning module may convert the image into machine-readable data.

At step 610, the MR application may render the source region data in an MR environment. The MR environment may be maintained by the smart glasses or by an external MR device interfacing with the smart glasses. At step 612, the smart glasses device may disconnect from the source region and connect to the target region.

At step 614, a user may view the target region through the smart glasses device. At step 616, the machine learning module within the smart glasses MR application may derive the database schema for the target region and apply the schema to the rendered data. At step 618, the MR application may display selectable options for modifying the data values or arrangement of the data values. For example, the user may remove a column of values. The MR application may display selectable options for replicating the data to generate a new sample set. The user may specify the size of the sample set, range of the sample set, and/or or any other suitable parameters.

At step 620, the smart glasses may transfer data from the MR environment to populate the target region. In some embodiments, the MR device may store the sample sets in database storage associated with the target region and a trigger may populate the database with the stored values.

Thus, methods and apparatus for INTELLIGENT DATABASE MIGRATION VIA MIXED REALITY are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for executing a database transfer using a mixed reality application on a smart glasses device, the method comprising:
   at a smart glasses device running a mixed reality application:
      at an embedded wireless communication interface, connecting to a source database having a first database schema;
      viewing a display associated with the source database;
      using one or more machine learning algorithms, identifying transfer values in a view of the display;
      capturing an image of the transfer values and storing the image on the smart glasses device, the capturing comprising prompting a user to scroll the display in order to completely capture identified transfer values;
      generating a mixed reality environment and displaying stored transfer values in the mixed reality environment;
      at the embedded wireless communication interface, connecting to a target database having a second schema;
      using one or more machine learning algorithms, deriving the second schema from values in the target database and applying the second schema to the transfer values;
      displaying selectable options for modifying the transfer values in the mixed reality environment, the options comprising inserting a value, creating a new column, moving a column, and selecting a subset of the values; and
      using the machine learning algorithms, generating logic for replicating the modified transfer values in the mixed reality environment, the replicating comprising creating a new sample set based on modified transfer values; and
   at the target database, populating the target database with values from the new sample set.

2. The method of claim 1, further comprising, a machine learning algorithm on the smart glasses device converting a captured image of the transfer values to machine-encoded text.

3. The method of claim 1, further comprising, based on a size of a sample set required for the target database, transmitting the transfer values to an intermediary device application associated with the target database for modification.

4. The method of claim 3, further comprising, at the intermediary device application, displaying selectable options for modifying the transfer values and generating a new sample set.

5. The method of claim 4, further comprising, at the intermediary device application, storing modified transfer values and the new sample set in temporary or permanent storage of the target database based at least in part on user access privileges for the target database.

6. The method of claim 3, further comprising, combining a plurality of transfers from the smart glasses device in the intermediary device application and displaying a selectable option for modifying combined transfer values.

7. The method of claim 1, further comprising, displaying the transfer values in the mixed reality environment by projecting data from the smart glasses device to an external screen.

8. The method of claim 7, wherein the external screen is a physical surface.

9. The method of claim 7, wherein the external screen is a virtual surface.

10. One or more non-transitory computer-readable media storing computer-executable instructions which, when executed by a processor on a computer system, perform a method for migrating data between databases using a mixed reality application on a smart glasses device, the method comprising:
    at a smart glasses device running a mixed reality application:
       using a wireless communication interface, connecting to a source database having a first database schema;
       viewing a display associated with the source database;
       using one or more machine learning algorithms, identifying transfer values in a view of the display;
       capturing an image of the transfer values and storing the image on the smart glasses device, the capturing comprising prompting a user to scroll the display in order to completely capture the identified transfer values;
       generating a mixed reality environment and displaying stored transfer values in the mixed reality environment;
       using the wireless communication interface, connecting to a target database having a second schema;
       using one or more machine learning algorithms, deriving the second schema from values in the target database and applying the second schema to the transfer values;
       displaying selectable options for replicating the transfer values in the mixed reality environment, the options comprising inserting a value, creating a new column, moving a column, and selecting a subset of data; and
       using one or more machine learning algorithms, generating logic for creating a new sample set based on replicated transfer values; and
    at the target database, populating the target database with values from the new sample set.

11. The media of claim 10, further comprising, a machine learning algorithm on the smart glasses device converting a captured image of the transfer values to machine-encoded text.

12. The media of claim 10, wherein, when a size of a sample set required for the target database exceeds a predetermined threshold, the mixed reality environment is maintained by an intermediary mixed reality device, the intermediary mixed reality device interfacing with the smart glasses device and the target database.

13. A system for migrating data between databases using a mixed reality application on a smart glasses device, the system comprising:

a source database having a first database schema and associated with a display comprising data from the source database;

a target database having a second database schema;

a smart glasses device running a mixed reality application, the application configured to:
  using a wireless communication interface, connect to the source database;
  using one or more machine learning algorithms, identify transfer data based at least in part on a view of the display; and
  capture an image of the transfer data and store the image on the smart glasses device; and an intermediary mixed reality device interfacing with the smart glasses device and configured to:
  generate a mixed reality environment and display stored transfer data in the mixed reality environment;
  using the wireless communication interface, connect to a target database;
  using one or more machine learning algorithms, derive the second database schema from data in the target database and apply the second schema to the transfer data;
  display selectable options for replicating the transfer data in the mixed reality environment, the options comprising inserting a value, creating a new column, moving a column, and selecting a subset of the data;
  using one or more machine learning algorithms, generate logic creating a new sample set comprising replicated transfer data; and
  populate the target database with values from the new sample set.

14. The system of claim 13, the mixed reality application configured to, using the machine learning algorithms, convert a captured image of the transfer data to machine-encoded text.

15. The system of claim 13, the intermediary mixed reality device comprising an intermediary application configured to store the replicated transfer data.

16. The system of claim 15, the intermediary application configured to display selectable options for modifying the data and generating a new sample set.

17. The system of claim 15, the intermediary application configured to store modified data and the new sample set in temporary storage associated with the target database based at least in part on user access privileges for the target database.

18. The system of claim 15, the intermediary application configured to combine a plurality of transfers from the smart glasses device and generate a sample set based on combined values.

19. The system of claim 13, further comprising an external screen configured to display transfer values rendered by the intermediary mixed reality device in the mixed reality environment.

20. The system of claim 19, the external screen comprising a physical surface.

21. The system of claim 19, the external screen comprising a virtual surface.

* * * * *